United States Patent [19]
Thoman et al.

[11] Patent Number: 5,890,435
[45] Date of Patent: Apr. 6, 1999

[54] INSULATED COMPOSITE RAILWAY BOXCAR AND METHOD

[75] Inventors: Mell R. Thoman, Carrollton; John W. Coulborn, Fort Worth, both of Tex.

[73] Assignee: TRN Business Trust, Dallas, Tex.

[21] Appl. No.: 859,671

[22] Filed: May 20, 1997

Related U.S. Application Data

[62] Division of Ser. No. 684,345, Jul. 19, 1996, Pat. No. 5,765,485.

Related U.S. Application Data

[60] Provisional application No. 60/001,348, Jul. 21, 1995, and provisional application No. 60/001,347, Jul. 21, 1995, and provisional application No. 60/001,346, Jul. 21, 1995.

[51] Int. Cl.$^6$ .................................................. B61D 17/00
[52] U.S. Cl. ........................... 105/404; 105/396; 105/397
[58] Field of Search ..................... 105/396, 397, 105/401, 404, 409, 413, 414, 416, 418, 419, 422, 423; 296/187, 193, 196, 197, 35.3; 52/17, 45

[56] References Cited

U.S. PATENT DOCUMENTS

| | | | |
|---|---|---|---|
| 709,894 | 9/1902 | Farrell ...................................... | 105/401 |
| 1,133,335 | 3/1915 | Summers ................................. | 105/404 |
| 1,170,129 | 2/1916 | Weaver . | |
| 1,749,473 | 3/1930 | Des Islets . | |
| 2,620,226 | 12/1952 | Jones ......................................... | 298/27 |
| 2,635,559 | 4/1953 | Nystrom et al. ......................... | 105/416 |
| 2,783,718 | 3/1957 | Cheshire .................................. | 105/419 |
| 2,788,750 | 4/1957 | Priest ....................................... | 105/406 |
| 3,057,284 | 10/1962 | Learmont ................................. | 410/135 |
| 3,100,458 | 8/1963 | Baker et al. ............................. | 105/397 |

(List continued on next page.)

FOREIGN PATENT DOCUMENTS

| | | | |
|---|---|---|---|
| 232242 | 6/1959 | Australia ................................. | 105/397 |
| 145249 | 12/1980 | Germany ................................. | 105/401 |
| 3911138 | 10/1990 | Germany . | |

OTHER PUBLICATIONS

"Trinity Steel Box Car Key Features" one page. no date.
"Shippers' Problems . . . Trinity's Solution!" Trinity Industries, Inc., on page. no date.
Letter from American Composite Inc. of Aug. 27, 1997 including a list of Custom Fiberglass and Composites. Aug. 1997.
Shippers'Problems . . . Trinity's Colution!, Trinity Industries, Inc. advertisement no date.
"Trinity Steel Box Car Key Features", specification sheet no date.
Co–pending application No. 08/684,345 entitled *Insulated Composite Railway Boxcar and Method* filed Jul. 19, 1996 (Attorney's Docket 091078.0444).

(List continued on next page.)

*Primary Examiner*—Mark T. Le
*Attorney, Agent, or Firm*—Baker & Botts, L.L.P.

[57] ABSTRACT

An insulated composite railway boxcar having a composite box structure mounted on a railway car underframe is provided. The composite box structure includes side walls, end walls and a floor molded as an integral unit with fiber reinforced plastic interior and exterior surfaces. The composite box structure includes a first fiber reinforced composite unit and a second fiber reinforced composite unit. The first fiber reinforce composite unit provides the end walls, side walls and floor for the railway boxcar. The second fiber reinforce unit may be permanently attached to the side walls and end walls to provide a roof for the boxcar. The railway car underframe has a center sill, side sills and end sills with a generally rectangular configuration and coplanar surfaces for adhesively bonding the composite box structure with the railway car underframe. Mechanical fasteners are also provided to couple the composite box structure with the railway car underframe.

16 Claims, 7 Drawing Sheets

5,890,435
Page 2

U.S. PATENT DOCUMENTS

| | | | |
|---|---|---|---|
| 3,175,520 | 3/1965 | Talmey | 105/409 |
| 3,252,430 | 5/1966 | Eckhardt et al. | 105/397 |
| 3,266,441 | 8/1966 | Pulcrano | 105/416 |
| 3,563,403 | 2/1971 | Luisada | 220/1.5 |
| 3,599,575 | 8/1971 | Yurkoski et al. | 105/358 |
| 3,616,764 | 11/1971 | Johnson et al. | 105/366 |
| 4,076,166 | 2/1978 | Austill | 228/157 |
| 4,209,892 | 7/1980 | Hofstaedter et al. | 105/401 |
| 4,226,189 | 10/1980 | Bertolini | 105/423 |
| 4,230,048 | 10/1980 | Gordon et al. | 105/248 |
| 4,275,662 | 6/1981 | Adler et al. | 105/377 |
| 4,286,507 | 9/1981 | Dorpmund | 98/32 |
| 4,292,898 | 10/1981 | Gordon et al. | 105/238 |
| 4,422,558 | 12/1983 | Mittelmann et al. | 220/1.5 |
| 4,469,541 | 9/1984 | Goldworthy | 156/180 |
| 4,474,632 | 10/1984 | Spees | 156/78 |
| 4,497,258 | 2/1985 | Ruhmann et al. | 105/248 |
| 4,498,941 | 2/1985 | Goldworthy | 156/148 |
| 4,608,931 | 9/1986 | Ruhmann et al. | 105/248 |
| 4,902,215 | 2/1990 | Seemann, III | 425/406 |
| 4,904,017 | 2/1990 | Ehrlich | 296/181 |
| 4,998,637 | 3/1991 | Marovskis | 220/1.5 |
| 5,042,395 | 8/1991 | Wackerle et al. | 105/397 |
| 5,050,402 | 9/1991 | Graaf | 62/457.9 |
| 5,052,906 | 10/1991 | Seemann | 425/112 |
| 5,114,516 | 5/1992 | Pilling et al. | 156/180 |
| 5,168,717 | 12/1992 | Mowatt-Larssen | 62/239 |
| 5,201,432 | 4/1993 | Jensen | 220/1.5 |
| 5,246,321 | 9/1993 | Hesch | 410/58 |
| 5,255,806 | 10/1993 | Korzeniowski et al. | 220/1.5 |
| 5,265,748 | 11/1993 | Furukawa | 220/1.5 |
| 5,299,405 | 4/1994 | Thompson | 52/795 |
| 5,316,462 | 5/1994 | Seemann | 425/112 |
| 5,320,046 | 6/1994 | Hesch | 105/413 |
| 5,362,345 | 11/1994 | Stettler et al. | 105/396 |
| 5,370,482 | 12/1994 | Long | 410/153 |
| 5,373,792 | 12/1994 | Pileggi et al. | 105/406 |
| 5,383,406 | 1/1995 | Vanolo et al. | 105/401 |
| 5,386,674 | 2/1995 | Sfirakis et al. | 52/243.1 |
| 5,392,717 | 2/1995 | Hesch et al. | 105/404 |
| 5,403,062 | 4/1995 | Sjostedt et al. | 296/181 |
| 5,403,063 | 4/1995 | Sjostedt et al. | 296/187 |
| 5,449,081 | 9/1995 | Sjostedt et al. | 220/15 |
| 5,450,977 | 9/1995 | Moe | 220/1.5 |
| 5,458,066 | 10/1995 | Ishida et al. | 105/397 |
| 5,601,034 | 2/1997 | Tao et al. | 105/423 |
| 5,690,378 | 11/1997 | Romesburg | 296/193 |

OTHER PUBLICATIONS

Co–pending application No. 08/684,564 entitled *Composite Box Structure for a Railway Boxcar* filed Jul. 19, 1996 (Attorney's Docket 091078.0446).

Co–pending application No. 08/684,537 entitled *Load Divider Assembly and Door Assembly for a Composite Railway Boxcar* filed Jul. 19, 1996 (Attorney's Docket 091078.0447).

Co–pending application No. 08/859,575 entitled *Insulated Composite Railway Boxcar Underframe* filed May 20, 1997 (Attorney's Docket 091078.0588).

Co–pending appliction No. 08/986,187 entitled *Railway Car Underframe for an Insulated Composite Boxcar* filed Dec. 5, 1997 (Attorney's Docket 091078.0650).

Single Page: "Freight Cars: Mechanical Refrigerator." Pacific Fruit Express, p. 135. (no date).

Manual: "Equipment Diagram for Unrestricted Interchange Service." Association of American Railroads Mechanical Division, Aug. 1991, pp. C–249 – C–256.2.

Article: "A better boat, a greener boatworks." Sail Magazine, Aug. 1993, pp. 27–29.

Brochure: "Simply . . . Making it Easier to Ship your Frozen Foods." General American Transportation Corporation. (no date).

Brochure: "Scrimp Systems . . . Composite performance and quality." Dupont, Delaware Technology Park. (no date).

Catalog pages from General American Transportaion Corporation on GATX ARCTICAR (8 pages). (no date).

Catalog pages from Stoughton Composites, Inc. on Domestic Container (5 pages). (no date).

Catalog pages from Pullman–Standard, Division of Pullman Incorporated, on Foamed–in–Place Insulated Box Cars (5 pages). (no date).

Catalog pages from Pacific Car and Foundry Company (19 pages). (no date).

Catalog page on C.H. Robinson 48–foot domestic container. (no date).

Catalog pages from Graaff GmbH on "Sandwich Technology for Refrigerated and Insulated Transport Equipment" May 1994 (9 pages).

Miscellaneous pages from *Introduction to Composites on Constituents of Composites* (20 pages). (no date).

G. Welty, "New Designs, New Materials, Freight Cars," Railway Age, Feb. 1994, p. 29.

M. Gabriele, "Pultrusions's Promise," Plastics Technology, Mar. 1995, p. 36.

"FRP Goes After Intermodal Container Market," Plastics World, Oct. 1993, p. 16.

Brochure, "Stoughton Composites, Inc. Introduces 'Light Weight Refrigerated Domestic Containers'," Stoughton Composites, Dec. 1993, pp. 1–10.

Drawing, "Car Body Assembly" Graaff GmbH, May 1994, p. 1.

Catalogue Item, "Durashield® Foam Core Building Panels," Ryerson Plastics Catalogue No. 21, 1992, p. 112.

INSULATED COMPOSITE RAILWAY BOXCAR AND METHOD

CROSS REFERENCE TO RELATED APPLICATIONS

This application is a divisional application of U.S. application Ser. No. 08/684,345, filed Jul. 19, 1996 now U.S. Pat. No. 5,765,485 and entitled "Insulated Composite Railway Boxcar and Method", which claims benefit of U.S. Provisional Application No. 60/001,348 filed Jul. 21, 1995; U.S. Provisional Application No. 60/001,347, filed Jul. 21, 1995; and U.S. Provisional Application No. 60/001,346, filed Jul. 21, 1995.

This application is related to co-pending applications U.S. application Ser. No. 08/684,564, filed on Jul. 19, 1996 and entitled "Composite Box Structure for a Railway Car" and U.S. application Ser. No. 08/684,537, filed on Jul. 19, 1996 and entitled "Load Divider Assembly and Door Assembly for a Composite Railway Boxcar" and U.S. application Ser. No. 08/859,575 filed May 20, 1997 and entitled "Insulated Composite Railway Boxcar and Method".

TECHNICAL FIELD OF THE INVENTION

This invention relates generally to insulated railway boxcars and more particularly to a railway boxcar having a composite box structure mounted on a railway car underframe.

BACKGROUND OF THE INVENTION

Over the years, general purpose railway boxcars have progressed from relatively simple wooden structures mounted on flat cars to more elaborate arrangements including insulated walls and refrigeration equipment. Various types of insulated railway boxcars are presently manufactured and used. A typical insulated railway boxcar includes an enclosed structure mounted on a railway car underframe. The enclosed structure generally has an outer shell, one or more layers of insulation and interior paneling. The outer shell of such railway boxcars often has an exterior surface formed from various types of metal such as steel or aluminum. The interior paneling is often formed from wood and/or metal as desired for the specific application. For some applications, the interior paneling has been formed from fiber reinforced plastic (FRP). Various types of sliding doors including plug type doors are generally provided on each side of conventional railway boxcars for loading and unloading freight. Conventional railway boxcars are assembled from various pieces of wood, steel and/or sheets of composite material such as fiberglass reinforced plastic. Significant amounts of raw material, labor and time are often required to complete the manufacture and assembly of conventional railway boxcars.

The underframe for many railway boxcars include a center sill with a pair of end sills and a pair of side sills arranged in a generally rectangular configuration corresponding approximately with the dimensions for the floor of the railway boxcar. Cross bearers and cross ties are provided to establish the desired rigidity and strength for transmission of vertical loads from the side sills to the center sill and for dissipating horizontal end loads on the center sill to other portions of the underframe. A plurality of longitudinal stringers are also provided on each side of the center sill to support the floor of the enclosed structure. Examples of such railway car underframes are shown in U.S. Pat. Nos. 2,783,718 and 3,266,441.

For many years various techniques have been used to build fiberglass boat hulls. Many of these hulls have been fabricated using wet layup techniques in which each layer of material such as fiberglass or carbon fiber is first wetted with the desired resin such as polyester or vinylester and then laid in an open mold. Recently, vacuum bagging techniques have been combined with wet layup techniques to control the emission of volatile organic compounds. Vacuum bagging also produced a stronger structure by eliminating air pockets and excess resin in the finished product.

More recently, vacuum bagging techniques have been combined with an enhanced resin delivery system which allows the use of a closed molding system and dry layup of core layers and fiber reinforcing layers such as fiberglass in the mold. This process may sometimes be referred to as composite resin infusion molding. U.S. Pat. Nos. 4,902,215; 5,052,906 and 5,316,462 provide additional information concerning this type of vacuum bagging process to form a fiberglass reinforced composite article.

Various types of load dividers and freight securing systems have previously been used to prevent undesired movement of freight contained within a railway boxcar. The use of such systems is particularly important when a railway boxcar is only partially loaded. Examples of such systems are shown in U.S. Pat. No. 5,370,482 entitled "*Cargo Securement System*" and U.S. Pat. No. 5,386,674 entitled "*Two Piece Bulkhead Door for Rail Cars and the Like.*" All patents noted in the Background of the Invention are incorporated by reference for all purposes within this application.

SUMMARY OF THE INVENTION

In accordance with the present invention, disadvantages and problems associated with previous insulated railway boxcars have been substantially reduced or eliminated. The present invention provides an insulated composite railway boxcar having enhanced insulation with substantially reduced heat transfer characteristics such that for some applications frozen food may be satisfactorily shipped without requiring the use of refrigeration equipment.

Technical advantages include incorporating lighter weight composite materials in accordance with teachings of the present invention to allow increasing both the volume and weight carrying capacity of the resulting railway boxcar. A railway boxcar formed from composite materials in accordance with teachings of the present invention is highly corrosion resistant as compared to most presently available railway boxcars. Also, the composite materials allow forming a railway boxcar with flush exterior surfaces which provide optimum aerodynamic performance and flush interior surfaces which allow easy cleaning of the interior to meet shipping requirements of the Food and Drug Administration, U.S. Agricultural Department and/or other government agencies. A railway boxcar formed from composite materials in accordance with teachings of the present invention may be easily repaired.

One aspect of the present invention includes providing an insulated railway boxcar with a composite box structure that substantially increases resistance to heat transfer through the box structure by eliminating metal corner posts, metal fasteners extending through the box structure and metal reinforcement of joints associated with the box structure while at the same time providing an aerodynamic, leakproof design. Also, all welding of the railway car underframe may be completed prior to mounting the composite box structure on the underframe to optimize procedures and minimize costs associated with fabrication of the railway car underframe.

A further aspect of the present invention includes providing an insulated railway boxcar having a railway car underframe with a large center sill, side sills and cross bearers such that all train loads placed on the boxcar are carried by the underframe. The railway car underframe can satisfactorily run with requiring structural support from the composite box structure to carry train loads.

BRIEF DESCRIPTION OF THE DRAWINGS

For a more complete understanding of the present invention, and the advantages thereof, reference is now made to the following written description taken in conjunction with the accompanying drawings, in which.

DETAILED DESCRIPTION OF THE INVENTION

The preferred embodiments of the present invention and its advantages are best understood by referring to FIGS. 1A through 14 of the drawings, like numerals being used for like and corresponding parts of the various drawings.

Figure 1A:
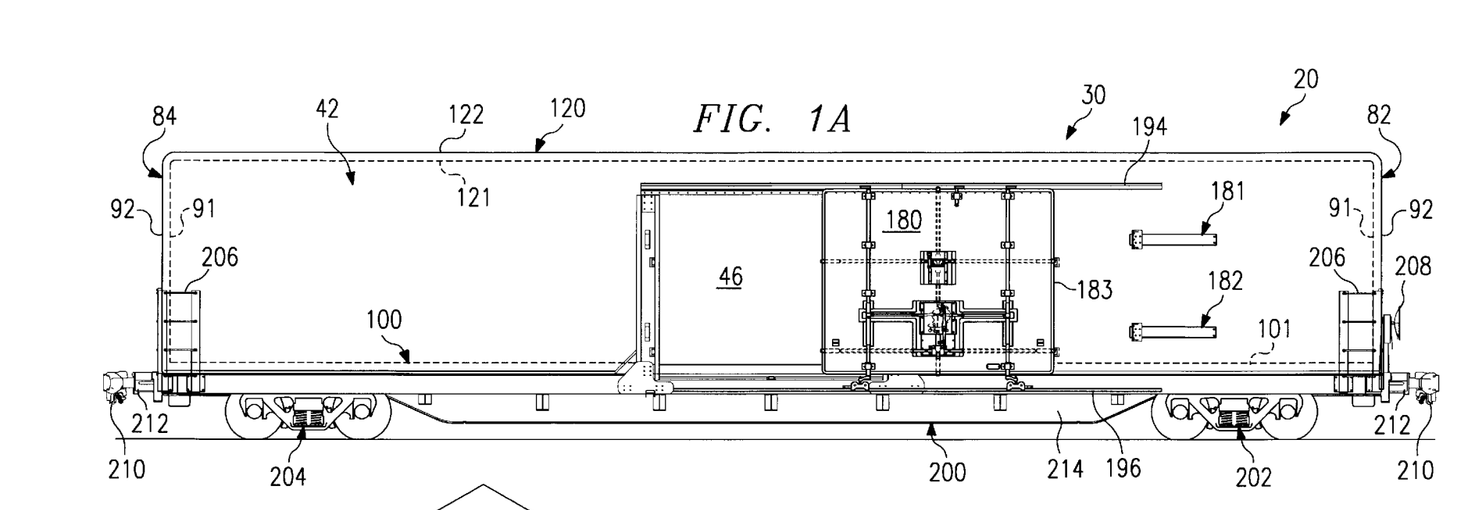
FIG. 1A is a schematic drawing in elevation showing a side view of an insulated composite railway boxcar incorporating one embodiment of the present invention.
Figure 1B:
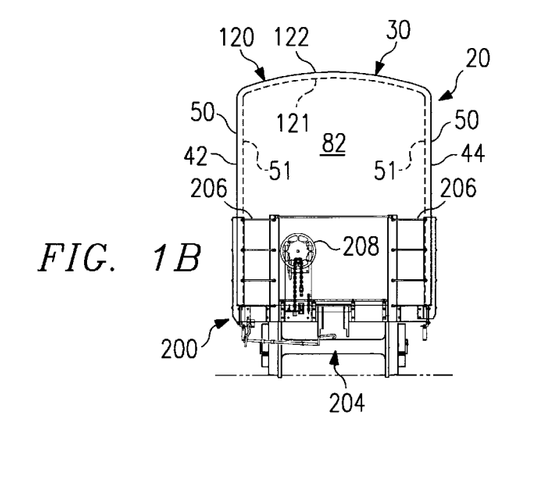
FIG. 1B is an end view of the railway boxcar of FIG. 1A.

Insulated composite railway boxcar 20 incorporating teachings of the present invention is shown in FIGS. 1A and 1B with composite box structure 30 mounted on railway car underframe 200. As will be explained later in more detail, composite box structure 30 is preferably both adhesively bonded and mechanically coupled with railway car underframe 200. For the embodiment of the present invention shown in FIGS. 1A and 1B, railway boxcar 20 has exterior dimensions which satisfy the requirements of Plate C and associated structural design requirements of the Association of American Railroads (AAR). Forming composite box structure 30 from light weight composite materials in accordance with teachings of the present invention allows a reduction in the weight of railway boxcar 20 while at the same time increasing both the internal volume and the load carrying capacity of railway boxcar 20 as compared to a conventional insulated boxcar within Plate C requirements.

For one application, composite box structure 30 has hollow interior 32 with dimensions of approximately sixty-eight feet in length, ten feet in width and twelve feet in height. For this application, railway boxcar 20 has a freight carrying capacity of approximately 6,291 cubic feet with a light weight of 86,000 pounds and a nominal load carrying capacity of 200,000 pounds which is very advantageous for an insulated railway boxcar satisfying the dimensional requirements of Plate C. Additional specifications for railway boxcar 20 are included at the end of this written description. As a result of the present invention, composite box structure 30 may be modified to accommodate various geometric configurations based on specific customer requirements concerning the size and type of freight that will be carried in the resulting railway boxcar 20.

For purposes of this patent application, the term "fiber reinforced plastic" is used to refer to composite materials composed of either a thermosetting or thermoplastic resin and fibers, filaments, or whiskers of material such as glass, metal, aramid, boron, carbon, aluminum silicate and other suitable ceramic materials. For purposes of this patent application, the term "resin" is used to include both naturally occurring and synthetic polymers which may be mixed with various additives such as fillers, colorants, plasticizers, and curing agents, to infuse or impregnate the selected fiber material to form the desired fiber reinforced plastic layers and surfaces during fabrication of composite box structure 30. For one application the fiber material preferably includes glass fibers typically associated with FIBERGLAS® products available from Owens-Corning.

Composite box structure 30 is preferably fabricated using vacuum bagging techniques which include dry lay up of selected core materials and multiple layers of the selected fiber materials in a closed molding system (not shown) along with an enhanced resin delivery system (not shown). Some of the benefits of using a closed molding system include the ability to fabricate a large number of composite box structures 30 from the same mold with dimensions that meet the selected AAR plate requirements and at the same time provide both a smooth, aerodynamic exterior surface and a smooth, easily cleaned interior surface for the resulting railway boxcar 20.

Closed molding systems and enhanced resin delivery systems may be modified to form composite box structure 30 with various configurations and dimensions as required for the specific railway boxcar 20. U.S. Pat. Nos. 4,902,215; 5,052,906 and 5,316,462 show examples of vacuum bagging techniques satisfactory for use with the present invention. Composite resin infusion molding processes incorporating various features of these patents have been licensed to Hardcore DuPont Composites L.L.C. located at 42 Lukens Drive, New Castle, Del. Various types of composite structures molded in accordance with the teachings of these patents are available from Hardcore DuPont.

For some applications, composite box structure 30 as shown in FIGS. 1A and 1B may be integrally molded as a single fiber reinforced composite unit with side walls 42 and 44, end walls 82 and 84, floor 100 and roof 120. For the embodiment shown in FIGS. 5 through 10, composite box structure 30 is formed from first fiber reinforced composite unit 40 and second fiber reinforced composite unit 120. Other configurations for first fiber reinforced composite unit 40 and second fiber reinforced composite unit 120 may be satisfactorily used to fabricate railway boxcar 20 in accordance with teachings of the present invention.

During the molding process generally rectangular openings 46 are formed in each side wall 42 and 44 intermediate the ends of the respective side walls 42 and 44. Doors 180 are slidably mounted on each side wall 42 and 44 adjacent to respective openings 46 for use in controlling access to interior 32 of railway boxcar 20. The height of each opening 46 preferably extends from floor 100 to the adjacent edge of roof 120. The center of each opening 46 corresponds approximately with the midpoint in the respective side wall 42 and 44. For one application each opening 46 has a height of approximately nine feet six inches which corresponds to the height of the respective side walls 42 and 44 between adjacent portions of floor 100 and roof 120.

Each door 180 has a first position blocking the respective opening 46 to form a thermal barrier between hollow interior 32 and the exterior of railway boxcar 20. Each door 180 also has a second position which allows access to hollow interior 32 of railway boxcar 20 through the respective opening 46. A pair of door stops 181 and 182 are preferably mounted on the exterior of each side wall 42 and 44 to limit the longitudinal movement of the respective door 180 from its first position to its second position.

In FIG. 1A, door 180 is shown slidably mounted on upper track 194 and lower track 196 intermediate its first position which blocks opening 46 and its second position in which edge 183 of door 180 contacts its respective door stops 181 and 182. For some applications, doors 180 are formed from composite materials similar to composite box structure 30.

Railway car underframe 200, as shown in FIGS. 1A and 1B, includes a pair of railway trucks 202 and 204 located adjacent to each end of railway boxcar 20. Safety equipment such as ladders 206 and hand brake 208 are preferably secured to railway car underframe 200 with no connections or attachments to composite box structure 30. Standard railway couplings 210 are also provided on center sill 214 at each end of railway car underframe 200. End of car cushioning units 212 are preferably disposed between each end of center sill 214 and the respective coupling 210. Railway couplings and end of car cushioning units satisfactory for use with the present invention are available from various vendors including FM Industries, Inc. located at 8600 Will Rogers Blvd., Fort Worth, Tex. 76140 and Keystone Railway Equipment Company located at 3420 Simpson Ferry Road, Camp Hill, Pa. 17001-0456.

One of the technical advantages of the present invention includes the ability to use end of car cushioning units 212 having appropriate lengths of travel, depending upon the intended application for resulting railway boxcar 20. Conventional railway boxcars are often limited to using sliding sills to cushion the associated underframe. Composite box structure 30 and railway car underframe 200 can accommodate various cushioning systems to optimize the performance of the resulting railway boxcar 20 and to protect freight contained within composite box structure 30.

For some applications, cushioning units 212 may have a length of travel of approximately fifteen (15) inches. For other applications, cushioning units 212 may have a length of travel of eighteen (18) inches, twenty (20) inches, twenty five (25) inches or more as desired. As a result of the present invention and particularly the attachment of composite box structure 30 with railway car underframe 200, the length of travel of cushioning units 212 may be selected to provide adequate protection for any freight carried within composite box structure 30 without requiring the use of a load divider system. U.S. Pat. No. 5,320,046 entitled *Low Profile Railway Car* shows an example of railway car couplings and cushioning units.

Figure 2:
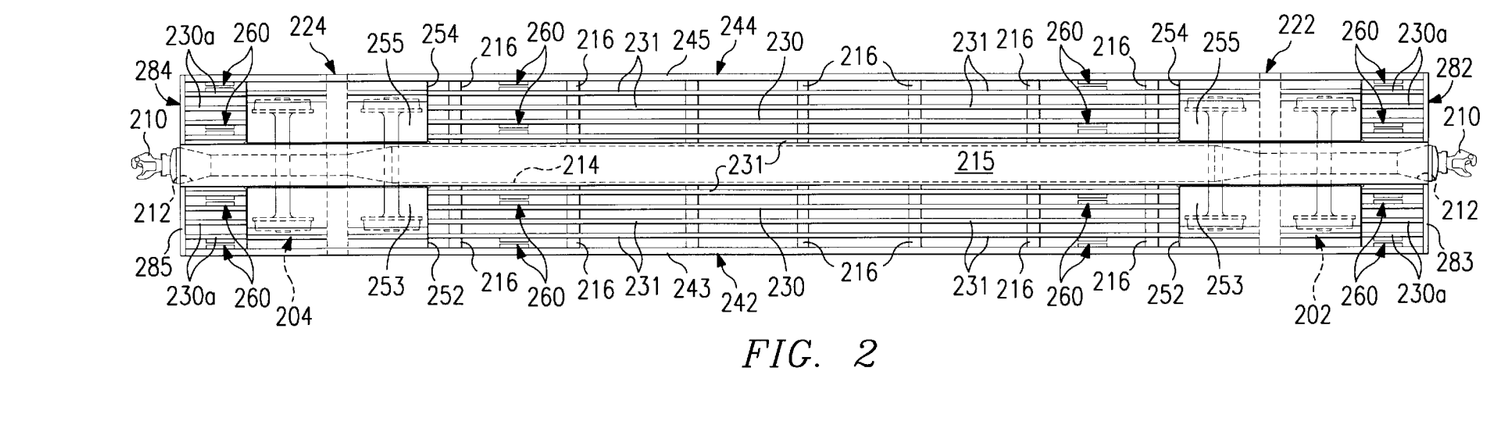
FIG. 2 is a schematic drawing showing a plan view of a railway car underframe incorporating one embodiment of the present invention satisfactory for use in assembling the railway boxcar of FIG. 1A.
Figure 3:
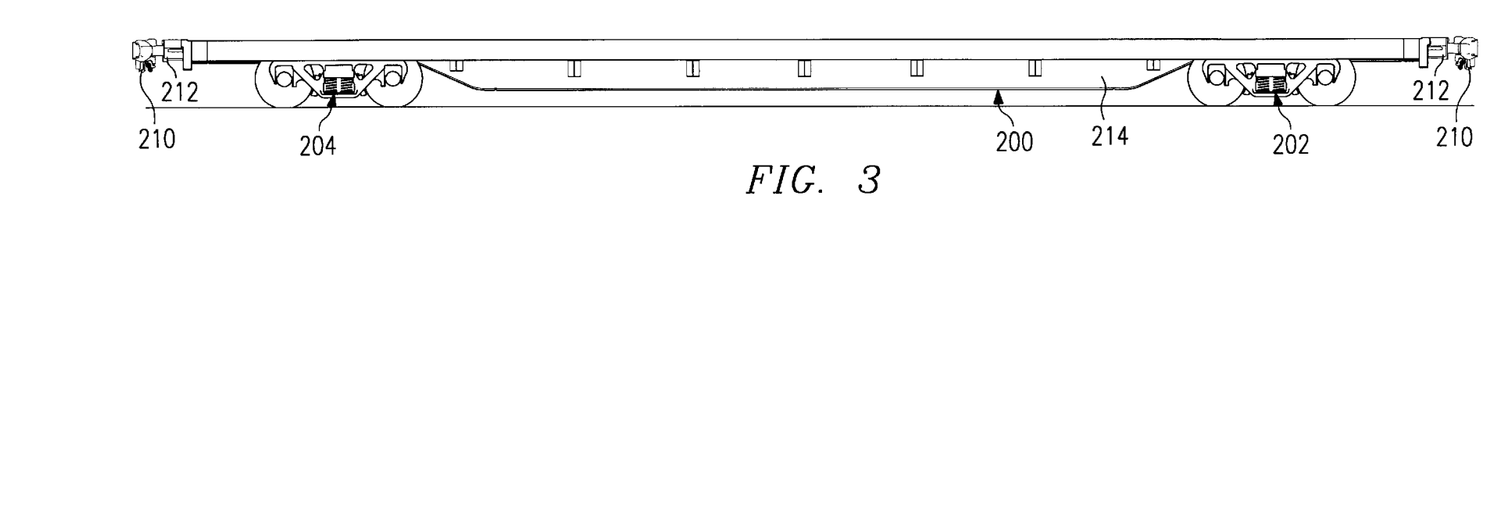
FIG. 3 is a side view of the railway car underframe of FIG. 2.
Figure 4:
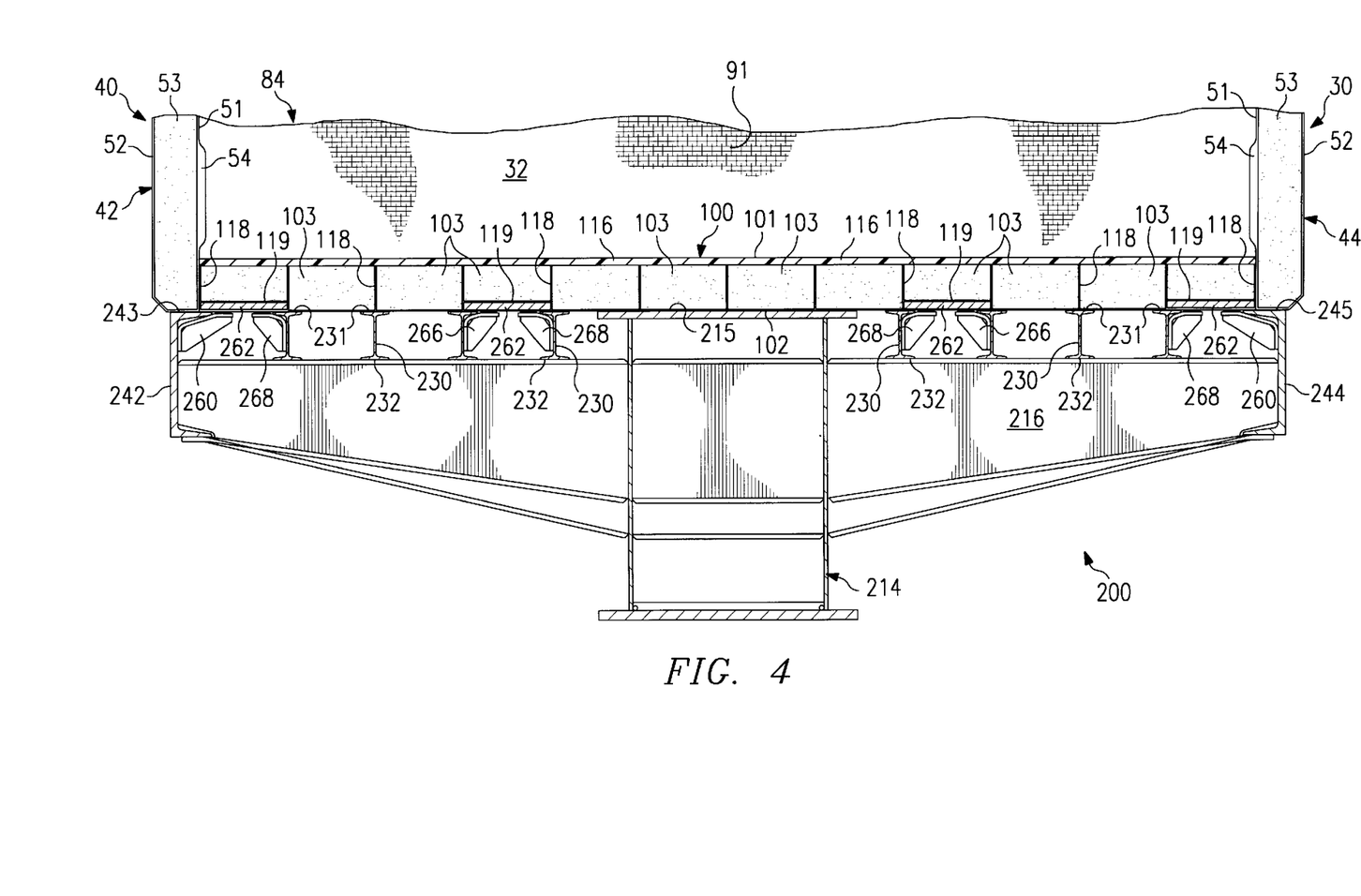
FIG. 4 is a schematic drawing in elevation and in section with portions broken away showing a composite box structure mounted on the railway car underframe of FIG. 2 to form the railway boxcar of FIG. 1A.

As shown in FIGS. 2, 3 and 4, railway car underframe 200 includes center sill 214 with a pair of end sills 282 and 284 and a pair of side sills 242 and 244 arranged in a generally rectangular configuration. The dimensions of the side sills 242 and 244 and end sills 282 and 284 correspond approximately with the dimensions associated with floor 100 of composite box structure 30. Railway car underframe 200 also includes a plurality of cross bearers 216 extending laterally between center sill 214 and the respective side sills 242 and 244. For the embodiment shown in FIG. 2, railway car underframe 200 includes seven cross bearers 216 spaced longitudinally from each other between railway trucks 202 and 204.

Railway car underframe 200 preferably includes a plurality of longitudinal stringers 230 extending parallel with center sill 214 and spaced laterally from each other between center sill 214 and the side sills 242 and 244. For the embodiment shown in FIG. 2, railway car underframe 200 includes four longitudinal stringers 230 between side sill 242 and center sill 214 and four longitudinal stringers 230 between center sill 214 and side sill 244. However, the number of longitudinal stringers may be varied depending upon the desired load carrying characteristics for the resulting railway boxcar 20.

As will be discussed later in more detail, center sill 214, side sills 242 and 244 and end sills 282 and 284 each have respective first surfaces 215, 243, 245, 282 and 285 which are disposed coplanar with each other. Each longitudinal stringer 230 includes first surface 231 disposed coplanar with the first surfaces 215, 243, 245, 282 and 285 and a second surface 232 resting on cross bearers 216. Portions of composite box structure 30 are preferably adhesively bonded or coupled with first surfaces 215, 231, 243, 245, 282 and 285. As will be explained later in more detail, loads placed on floor 100 within composite box structure 30 are transmitted through longitudinal stringers 230 onto cross bearers 216 and then to center sill 214.

Railway car underframe 200 also includes a pair of body bolsters 222 and 224 with each body bolster 222 and 224 disposed over respective railway trucks 202 and 204. Body bolsters 222 and 224 extend laterally between center sill 214 and the respective side sills 242 and 244. As best shown in FIG. 2, each body bolster 222 and 224 includes a pair of cover plates 252 and 254 which extend over the respective railway trucks 202 and 204.

Cover plates 252 and 254 are preferably formed from relatively thick metal plates with dimensions selected to provide clearance for the wheels of the associated railway trucks 202 and 204. Cover plates 252 and 254 are sized to accept loads from floor 100 and to transfer these loads to center sill 214 and side sills 242 and 244. Cover plates 252 and 254 also protect adjacent portions of composite box structure 30 from any debris thrown from the respective railway trucks 202 and 204. Cover plates 252 and 254 structurally support the relatively short portions of longitudinal stringers 230 extending between cover plates 252 and 254 and the respective end sills 282 and 284. In FIG. 2, these portions of longitudinal stringer 230 have been designated 230a.

Each cover plate 252 includes first surface 253 disposed coplanar with first surface 215 of center sill 214 and first surface 243 of side sill 242. Each cover plate 254 includes first surface 255 which is also disposed coplanar with first surface 215 of center sill 214 and first surface 245 of side sill 244. First surfaces 253 and 254 are also located on cover plates 252 and 254 opposite from railway trucks 202 and 204. As will be discussed later in more detail, portions of composite box structure 30 may be adhesively coupled with first surfaces 253 and 254 of each body bolster 222 and 224.

Both the width and depth of center sill 214 has been substantially increased as compared to center sills associated with conventional railway boxcars. Each cross bearer 216 also has sufficient depth such that cross bearers 216 can satisfactorily transfer loads placed on side sills 242 and 244 and longitudinal stringers 216 onto center sill 214. As a result of the teachings of the present invention, railway car underframe 200 is able to absorb all of the vertical forces associated with loads placed on composite box structure 30 and satisfy minimum stiffness requirements with only a very limited amount of deflection. For one application center sill 214 has a width and depth of approximately thirty inches and a deflection of less than one inch when railway boxcar 20 is fully loaded.

One of the technical advantages of the present invention includes providing both adhesive bonding and mechanical coupling between composite box structure 30 and railway car underframe 200. A plurality of mechanical tie down connection assemblies 260 are preferably attached to selected longitudinal stringers 230 for use in mechanically coupling composite box structure 30 with railway car underframe 200. For the embodiment shown in FIG. 2 railway car underframe 200 may include sixteen or more mechanical tie down connection assemblies 260. Four mechanical tie down connection assemblies 260 are coupled to railway car underframe 200 on opposite sides of each body bolsters 222 and 224. Another set of four mechanical tie down assemblies 260 (not shown in FIG. 2) may also be installed extending laterally from approximately the midpoint of center sill 214.

After composite box structure 30 has been permanently attached with railway car underframe 200, hand brake assembly 208 and safety appliances such as ladders 206 may be secured to railway car underframe 200 without requiring any connection or attachment to composite box structure 30.

As a result of the present invention, a wide variety of materials may be used to form the various components associated with railway care underframe 200. For example, center sill 214, cross bearers 216, body bolsters 222 and 224, cover plates 252 and 254, longitudinal stringers 230 and mechanical tie down connection assemblies 260 and other components associated with railway car underframe 200 may be satisfactorily formed from various steel alloys, aluminum alloys, fiber reinforced plastics, cermets and composites of these materials. Composite box structure 30 allows selecting a wide variety of materials and composites for use in fabricating railway car underframe 200 to optimize both performance characteristics and manufacturing costs associated with the resulting railway boxcar 20.

Figure 8:
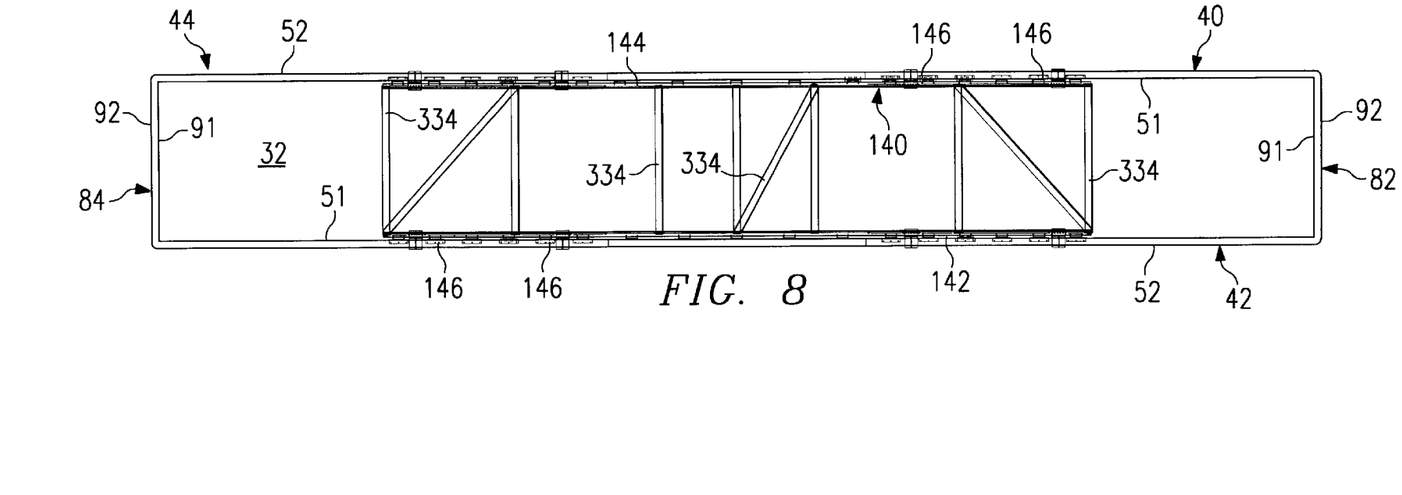
FIG. 8 is a schematic drawing showing a plan view of an upper load divider track assembly mounted on opposite side walls of the composite box structure of FIG. 5.
Figure 12:
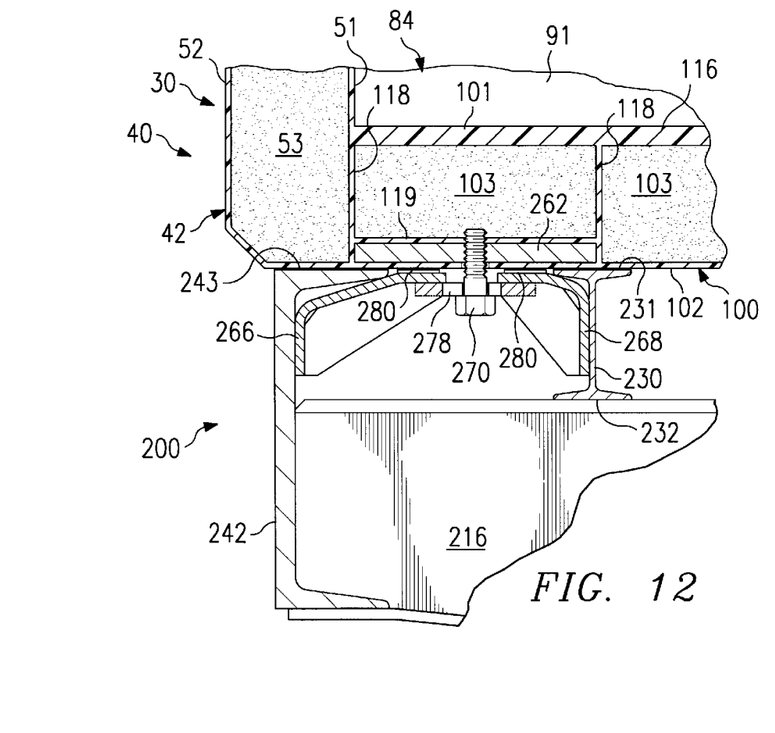
FIG. 12 is an enlarged schematic drawing in section and in elevation with portions broken away showing a mechanical tie down connection used to attach the composite box structure of FIG. 5 with the railway car underframe of FIG. 2.

As shown in FIGS. 4, 8, and 12, side walls 42 and 44, along with end walls 82 and 84 and floor 100, cooperate with each other to partially define hollow interior 32 of composite box structure 30. Hollow interior 32 corresponds with the interior of railway boxcar 20 in which various types of freight may be placed for shipment by railway boxcar 20. Side walls 42 and 44, end walls 82 and 84 and floor 100 are preferably integrally molded with each other using vacuum bagging techniques to form first fiber reinforced composite unit 40. Similar molding techniques may be used to form second fiber reinforced composite unit or roof 120.

Both first composite unit 40 and second composite unit 120 preferably have a foam core wrapped with multiple plies of fiber material which has been infused with a selected resin to encapsulate the foam core with one or more layers of fiber reinforced plastic. The multiple plies of fiber material and the selected resin also form fiber reinforced plastic interior surfaces and exterior surfaces for composite box structure 30. For some applications, side walls 42 and 44, end walls 82 and 84, floor 100 and roof 120 may be integrally joined with each other by molding as a single fiber reinforced composite unit in a closed molding system (not shown). Materials other than foam may be satisfactorily used to form the core portions of composite box structure 30.

As shown in FIGS. 4 and 12, first layer 51 of fiber reinforced plastic is preferably disposed on the interior surface of each side wall 42 and 44. Second layer 52 of fiber reinforced plastic is preferably disposed on the exterior surface of each side wall 42 and 44. Each side wall 42 and 44 preferably includes foam core 53 encapsulated between layers 51 and 52 of fiber reinforced plastic. In a similar manner first layer 91 of fiber reinforced plastic is preferably disposed on the interior of each end wall 82 and 84. Second layer 92 of fiber reinforced plastic is preferably disposed on the exterior of each end wall 82 and 84. Each end wall 82 and 84 includes a foam core (not expressly shown) encapsulated between layers 91 and 92 of fiber reinforced plastic. Floor 100 includes a plurality of foam cores 103 encapsulated between interior surface 101 and exterior surface 102 of fiber reinforced plastic. Roof 120 includes a foam core (not expressly shown) encapsulated between layers 121 and 122 of fiber reinforced plastic.

For some applications, portions of layers 51, 52, 91, 92, 121, and 122 may be formed from two or more plies of fiber material (not expressly shown). For example, two, three or four plies of fiber material may be used to form reinforced strike zone 54 as part of each first layer 51 adjacent to and extending longitudinally parallel with floor 100. The thickness of strike zones 54 is exaggerated in FIG. 4 for purposes of illustration.

Strike zones 54 provide increased resistance to damage caused by freight contacting inside layer 51 of the respective side walls 42 and 44. One of the technical benefits of the present invention includes providing multiple plies of fiber material to reinforce selected portions of either the interior surface or the exterior surface of composite box structure 30.

As a result of the molding process first layers 51, 91 and 101 provide a continuous, smooth interior surface of fiber reinforced plastic for railway boxcar 20. In a similar manner exterior surfaces 52, 92 and 102 are integrally molded with each other to form a continuous, smooth exterior surface of fiber reinforced plastic for railway boxcar 20. As shown in FIG. 4, fiber reinforced plastic interior surface 101 of floor 100 is a generally smooth, continuous, flush surface with no indentations or openings.

Foam cores 53 and 103 and the foam cores for end walls 82 and 84 and roof 120 may be formed from various types of material such as urethane, polyurethane, styrene and polystyrene. For some applications these foam cores may include light metal foam. Also, foam cores 53 and 103 may have various configurations such as foam blocks wrapped with one or more plies of selected fiber material or layers of a selected foam material alternating with plies of the selected fiber material. For still other applications, foam cores 53 and/or 103 may be replaced with light weight wood such as balsa wood or a heavier wood such as plywood.

The selected core and multiple plies of fiber material are placed in closed molding systems having the desired configuration for first composite unit 40, second composite unit 120, or composite box structure 30 if molded as a single unit. A resin delivery system is used to infuse or impregnate the multiple plies of fiber material with the selected resin. Depending upon the intended application for the resulting railway boxcar 20, the fiber material may include carbon, boron, graphite, glass, and aramid or a combination of these materials. Aramids such as KEVLAR® fibers and NOMEX® fibers available from E.I. DuPont DeNemours & Co. may be particularly useful in fabricating railway boxcars. Other fiber materials may be satisfactorily used with the present invention. Depending upon the intended application for railway boxcar 20, the resin may be selected from a wide variety of polymers including epoxy, polyester, vinylester and vinyl. Again, other resins may be satisfactorily used with the present invention.

By properly selecting the type of core and fiber material along with other teachings of the present invention which substantially reduce or minimize potential heat transfer paths, composite box structure 30 may have a heat transfer rate of approximately one hundred sixteen (116) BTUs per hour per degree Fahrenheit or less. One of the technical advantages of the present invention includes the ability to select various core materials and fiber materials and to vary the configuration of these materials to enhance both the structural and thermal performance of the resulting composite box structure 30.

As shown in FIGS. 4 and 12, the closed molding system and infusion of resin results in a continuous web of fiber reinforced plastic encapsulating the selected core material. Foam core 53 in both sidewalls 42 and 44 is formed from a plurality of foam blocks which have been wrapped with one or more plies of the selected fiber material and impregnated with the selected resin to form a continuous web of fiber reinforced plastic layers between adjacent foam blocks and fiber reinforced plastic layers 51 and 52. For some application foam blocks 53 may be coated or treated to prevent absorption or infusion of the selected resin.

Foam core 103 for floor 100 may also be formed from a plurality of foam blocks wrapped with one or more plies of fiber material and impregnated with the selected resin during the molding process. The foam cores for end walls 82 and 84 and roof 120 may include a plurality of foam blocks which have been wrapped with one or more plies of fiber material and impregnated with the selected resin during the molding process.

Alternatively, the foam cores may be formed from a grid of the selected core material alternating with plies of the selected fiber material. The configuration of both the core material and fiber material may be varied to provide the desired structural strength for the respective side walls 42 and 44, end walls 82 and 84, floor 100 and roof 120. The resulting grid (not expressly shown) of core material and alternating plies of fiber material are preferably covered with one or more plies of fiber material and infused with the selected resin to form the corresponding interior surfaces 51, 91, 101, and 121 having at least one layer of fiber reinforced plastic and the corresponding exterior surfaces 52, 92, 102 and 122 also having at least one layer of fiber reinforced plastic with the grid of foam material and fiber reinforced plastic layers encapsulated therebetween. For one application end walls 82 and 84 have been formed with this grid configuration. U.S. Pat. No. 5,052,906 shows the use of multiple plies of fiber material and a grid type resin distribution system which may be satisfactorily used with the present invention.

FIGS. 4 and 12 are schematic representations showing portions of floor 100 disposed on railway car underframe 200. Floor 100 preferably includes a plurality of foam blocks 103 which have each been wrapped with one or more plies of fiber material (not expressly shown). During the molding process, blocks 103 are disposed adjacent to each other extending over the length and width of floor 100. This configuration results in vertical plies of fiber material being disposed between adjacent foam blocks 103 and extending longitudinally along the length of floor 100. At least one ply of fiber material is disposed on the interior portions of foam blocks 103. A second ply of fiber material is disposed on the exterior of foam blocks 103. For some applications, floor 100 could then be formed by infusing or molding the plies of fiber material with the selected resin.

For many applications, foam blocks 103 encapsulated by relatively thin layers of fiber reinforced plastic will not adequately carry compression and shear forces associated with placing heavy loads on interior surface 101 of floor 100. An example of such a heavy load would be a forklift moving freight within railway boxcar 20. Thus, a layer of felt type material (not expressly shown) such as polyester is preferably placed on the first ply of fiber along with two or more additional plies of fiber material. The alternating configuration of felt type material and multiple plies of fiber material results in providing a thick layer 116 of fiber-reinforced plastic extending over the length and width of interior surface 101 of floor 100. Felt fibers generally have a random distribution while fiberglass fibers are often oriented in only one direction. Combining one or more felt fiber layers with one or more plies of fiberglass fibers will provide more uniform resistance to wear on floor 100. For one application a layer of felt fiber material approximately 0.5 inches thick is preferably the last layer used to form interior surface 101 because the random fiber orientation provides better long term wear.

Combining plies of felt fiber and fiberglass may also reduce to overall cost of floor 100. The use of vacuum bagging techniques and dry layup of the selected core materials and multiple plies of the selected fiber material allow varying the cross section associated with floor 100 depending upon the specific application in which the resulting railway boxcar 20 will be used.

The width of foam blocks 103 is selected to be approximately equal to the distance between the center line of adjacent longitudinal stringers 230. Thus, vertical plies of fiber material are positioned within floor 100 during dry layup at a location corresponding approximately with the position of the respective longitudinal stringer 230 in railway car underframe 200. When the plies of fiber material are infused with the selected resin, the resulting composite is a thick layer 116 of fiber reinforced plastic joined in a continuous web with vertical layers 118 of fiber reinforced plastic as shown in FIGS. 4 and 12. Thus, any loads placed on interior surface 101 of floor 100 are transmitted through thick layer 116 of fiber reinforced plastic to vertical layers 118 of fiber reinforced plastic and the respective longitudinal stringer 230 to provide the desired load carrying capacity for floor 100.

For the embodiment of the present invention shown in FIG. 4, floor 100 includes thirteen vertical layers 118 of fiber reinforced plastic disposed within foam core 103 between interior surface 101 and exterior surface 102. Vertical layers 118 of fiber reinforced plastic extent longitudinally along the length of floor 100 and are spaced laterally from each other across the width of floor 100. For the embodiment shown in FIG. 4, one of the vertical layers 118 of fiber reinforced plastic is disposed on each side sill 242 and 244. Three of the vertical layers 118 of fiber reinforced plastic are disposed on center sill 214. The remaining vertical layers 118 of fiber reinforced plastic are disposed respectively on first surfaces 231 of longitudinal stringers 230. The number of longitudinal stringers 230 and vertical layers 118 may be varied depending upon the intended use of the resulting railway boxcar 20.

As previously noted, one of the technical benefits of the present invention includes both adhesive bonding and mechanical coupling of composite box structure 30 with railway car underframe 200. A plurality of metal plates 262 are preferably integrally molded within floor 100 adjacent to exterior surface 102. Each metal plate 262 preferably includes at least one threaded opening 264 extending therethrough for use in providing the mechanical connections with railway car underframe 200. Metal plates 262 are disposed between vertical layers 118 of fiber reinforced plastic as shown in FIGS. 4 and 12

For one application, metal plates 262 have a generally rectangular configuration approximately nine inches in width, sixteen inches in length and three-quarters of an inch thick. Metal plates 262 are preferably wrapped with one or more plies of fiber material prior to infusion of the resin. For the embodiment shown in FIGS. 4 and 12, two plies of fiber material may be used to form exterior layer 102 and vertical layers 118. A single ply of fiber material may be used to form fiber reinforced plastic layer 119 to encapsulate the associated metal plate 262. By placing metal plates 236 adjacent to exterior surface 102, approximately three to four inches of foam core 103 are provided to block heat transfer between metal plates 262 and interior 32 of composite box structure 30.

Figure 11:
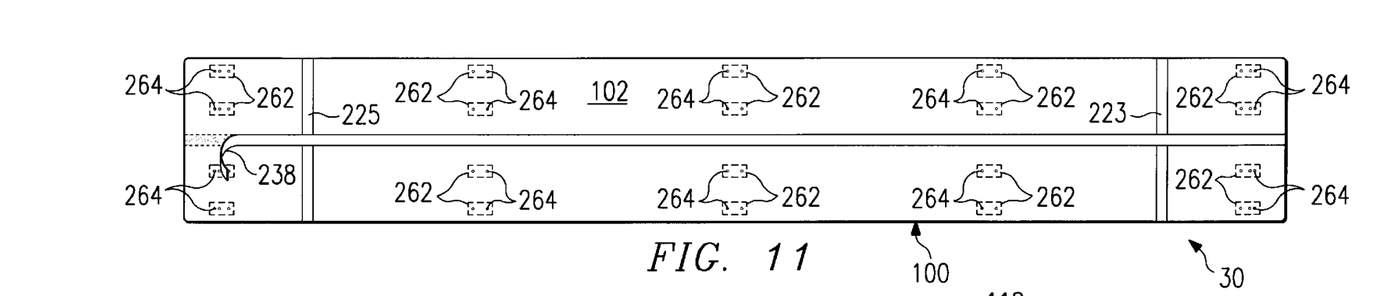
FIG. 11 is a schematic drawing showing various features associated with the floor of a composite box structure for use in attaching the composite box structure to a railway car underframe in accordance with one aspect of the present invention.

The location of metal plates 262 in floor 100, as shown in FIG. 11, is selected to correspond with the location of mechanical tie down connections 260 of railway car underframe 200 as shown in FIG. 2. The number of threaded openings 264 in plates 262 may be varied depending upon the location of each specific metal plate 262 and the intended application for the resulting railway boxcar 20. As shown in FIG. 11, metal plates 262 adjacent to each end of floor 100 have three threaded openings 264. Metal plates 262 located closer to the middle of floor 100 may have only two threaded openings 264. A set of four metal plates 262 may also be included in floor 100 extending laterally from a position corresponding approximately to the midpoint of center sill 214. Metal plates 262 and the associate mechanical tiedown connection assembly 260 cooperate with each other to ensure a more uniform, continuous adhesive bond between the exterior of floor 100 and adjacent surfaces of railway car underframe 200.

As shown in FIGS. 4 and 12, a layer of foam 103 and at least one layer of fiber reinforcing plastic is preferably disposed between each metal plate 262 and interior surface 101 of floor 100. This configuration substantially prevents mechanical tie down connections 260 from acting as thermal short circuits through composite box structure 30. The other mechanical connections associated with composite box structure 30 use this same feature of the present invention to substantially reduce the transfer of thermal energy between the interior and the exterior of railway boxcar 20.

Mechanical tie down connection assemblies 260 are attached to railway car underframe 200 as shown in FIGS. 2, 4 and 12. Each mechanical tie down connection assembly 260 preferably includes a pair of securing brackets 266 and 268. Securing brackets 266 and 268 are attached to longitudinal stringers 230 and side sills 242 and 244 at the selected location for the respective mechanical tie down connection 260 by welding or other suitable techniques. The configuration of securing brackets 266 or 268 may be modified as required to accommodate the configuration of the respective portion of side sills 242 and 244 and longitudinal stringers 230. Each mechanical tie down connection 260 includes at least one threaded bolt 270 extending upwardly therefrom for engagement with a respective threaded opening 264 in metal plates 262 disposed in floor 100 of composite box structure 30.

For some applications, holes 264 in metal plates 262 are filled with clay or a similar type of material to protect threaded holes 264 during molding and shipment of composite box structure 30. After composite box structure 30 has been placed on railway car underframe 200, the clay may be removed from holes 264 and bolts 270 inserted through appropriate locations in the respective mechanical tie down connection 260. The number of bolts 270 may be varied depending upon the location of the respective plate 262 in floor 100.

Figure 13:
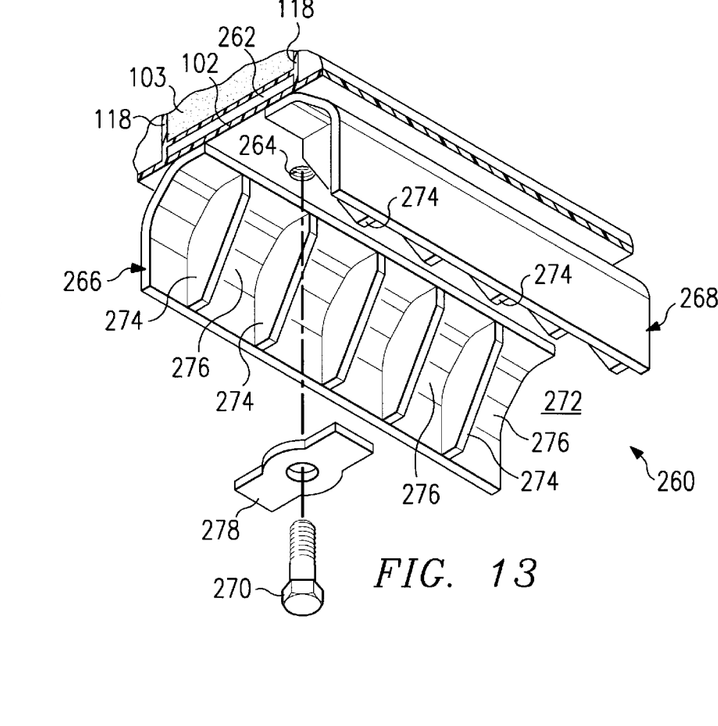
FIG. 13 is an isometric drawing with portions broken away showing an exploded view of a mechanical tie down connection incorporating one embodiment of the present invention for use with the railway car underframe of FIG. 2.

As best shown in FIG. 13 securing brackets 266 and 268 are spaced laterally from each other to define channel or trough 272. A plurality of partitions or gussets 274 are attached to the interior of each securing bracket 266 and 268 to form pockets 276 between adjacent partitions 274. The dimensions of partitions 274 and the resulting pockets 276 are selected to receive rectangular washer 278. For the embodiment of the present invention as shown in FIG. 13, mechanical tie down connection 260 has four pockets 276 which provide four locations for installation of bolt 270 and respective rectangular washer 278. Each bolt 270 may be inserted through its associated washer 278 and engaged with the respective opening 264 of plate 262 to mechanically engage floor 100 of composite box structure 30 with railway car underframe 200 as shown in FIG. 12. For some applications, spacers 280 may be disposed between securing brackets 266 and 268 and exterior surface 102 of floor 100 as shown in FIG. 12. For some applications, one hundred and eighty (180) foot pounds of torque may be applied to bolts 270.

FIGS. 5–10 show various steps associated with assembling composite box structure 30 with railway car underframe 200 to form railway boxcar 20 in accordance with one embodiment of the present invention. First fiber reinforced composite unit 40 and second fiber reinforced composite unit 120 may be formed as separate units at a molding facility (not shown) having the desired closed molding system. First composite unit 40 and second composite unit 120 may then be shipped to a railway car fabrication facility (not explicitly shown) where composite box structure 30 will be mounted on and permanently secured to railway car underframe 200.

Figure 5:
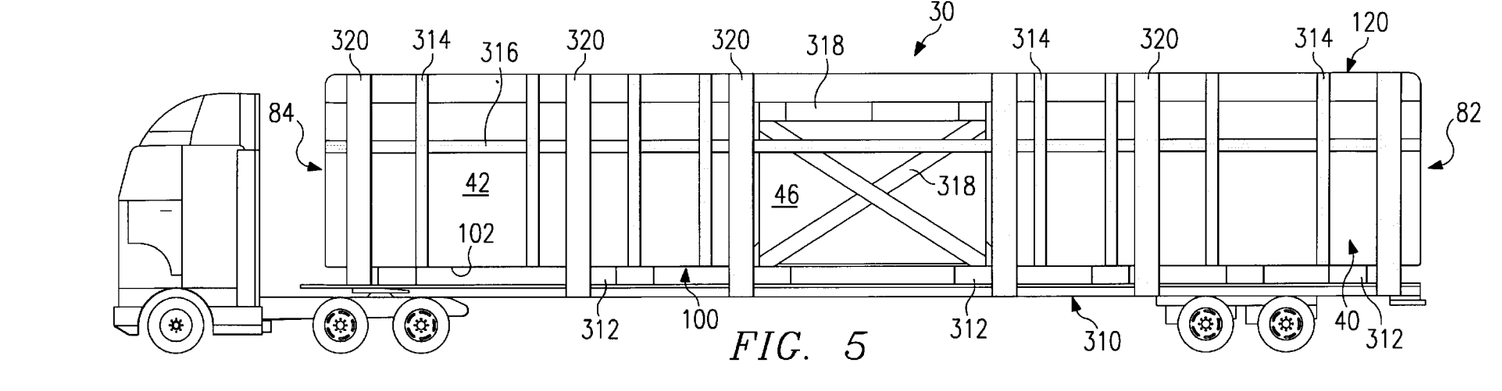
FIG. 5 is a schematic drawing in elevation showing a side view of a composite box structure loaded on a highway truck trailer for shipment in accordance with one embodiment of the present invention.

Upon completion of the molding process, second fiber reinforced composite unit 120 may be placed on side walls 42 and 44 and end walls 82 and 84 opposite from floor 100. A plurality of vertical straps 314 may be wrapped around first composite unit 40 and second composite unit 120 to releasably hold second composite unit 120 on sidewalls 42 and 44 and end walls 82 and 84 during shipment of composite box structure 30 from the molding facility to the railway car fabrication facility. As shown in FIG. 5, composite box structure 30 may be placed on highway truck trailer 310 for shipment. A plurality of supporting blocks 312 are preferably placed between exterior surface 102 of floor 100 and highway truck trailer 310.

Prior to mounting composite box structure 30 on railway car underframe 200, first fiber reinforced composite unit 40 will have a tendency to bend or flex as a result of openings 46 in sidewalls 42 and 44. Prior to shipment of composite box structure 30, wooden frame 318 is preferably placed within each opening 46 formed in side walls 42 and 44. At least one horizontal strap 316 extends around the exterior of end walls 82 and 84 and side walls 42 and 44. Horizontal strap 316 in cooperation with frames 318 limit the tendency of first fiber reinforced composite unit 40 to flex or bend prior to mounting composite box structure 30 on railway car underframe 200 and permanently attaching roof 120. A plurality of truck straps 320 are also wrapped around composite box structure 30 and highway truck trailer 310 to releasably secure composite box structure 30 with highway truck trailer 310 during shipment. For some applications, composite box structure 30 may be shipped from the molding facility to the boxcar fabricating facility on a flat bed railway car or a barge. For purposes of illustration, composite box structure 30 is shown on highway truck trailer 310 in FIG. 5.

Prior to loading composite box structure 30 onto highway truck trailer 310, a heavy plastic covering or sheets of plywood may be placed over each opening 46. Wooden frames 318 are also placed within each opening 46 to stabilize composite box structure 30 during lifting operations. After wooden frames 318 have been installed, horizontal strap 316 is preferably placed around the exterior of first composite unit 40. Vertical straps 314 are then placed around first composite unit 40 and second composite unit 120 prior to lifting composite box structure 30 onto highway truck trailer 310.

When highway truck trailer 310 with composite box structure 30 arrives at the railway boxcar fabrication facility, truck straps 320 are removed. Vertical straps 314 and horizontal strap 316 along with frame 318 remain in place. The plastic cover or plywood on openings 46 may be removed if desired.

Figure 6:
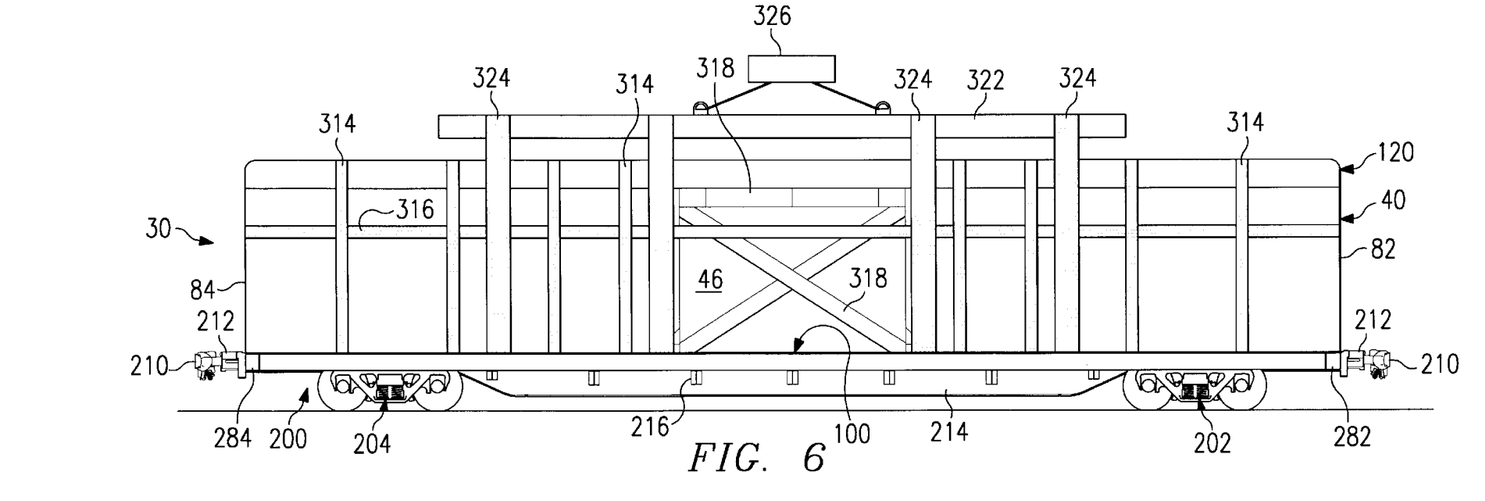
FIG. 6 is a schematic drawing in elevation showing the composite box structure of FIG. 5 placed on the railway car underframe of FIG. 3.

One or more cranes 326 (not expressly shown) may be used to lift composite box structure 30 from highway truck trailer 310 onto railway car underframe 200. As shown in FIG. 6, a spreader beam 322 is attached to crane 326. A plurality of lifting straps 324 are wrapped around portions of composite box structure 30 and spreader beam 322. Composite box structure 30 is then placed on railway car underframe 200 with metal plates 262 in floor 100 aligned with corresponding mechanical tie down connection assemblies 260 in railway car underframe 20. Composite box structure 30 may then be permanently attached to railway car underframe 20 by forming a plurality of mechanical connections and/or adhesively bonding portions of composite box structure 30 with portions of railway car underframe 200.

As previously noted, first surface 215 of center sill 214, first surfaces 231 of longitudinal stringers 230, first surface 243 of side sill 242, first surface 245 of side sill 244, and first surfaces 253 and 255 of body bolsters 222 and 224 are preferably disposed coplanar with each other for use in adhesively bonding portions of first fiber reinforced composite unit 40 with railway car underframe 200. Beads of a selected adhesive 236 and spacers 234 are preferably placed on selected portions of first surfaces 215, 231, 243, 245, 253 and 255. As discussed below, corresponding portions of exterior surface 102 of floor 100 are prepared for adhesive bonding with first surfaces 215, 231, 243, 245, 253 and 255.

Figure 14:
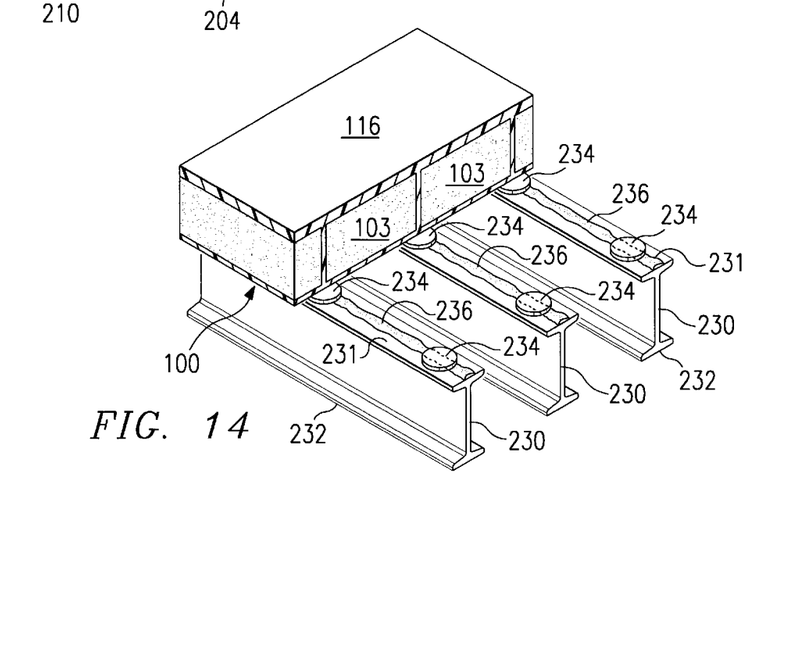
FIG. 14 is a schematic drawing showing beads of adhesive and spacers placed on longitudinal stringers for use in adhesively bonding a composite box structure with a railway car underframe in accordance with teachings of the present invention.

For purposes of illustration, portions of first surfaces 231 of longitudinal stringers 230 are shown in FIG. 14 with spacers 234 intermittent beads of adhesive 236. Spacers 234 control the thickness of the adhesive bond formed between selected portions of exterior surface 102 and respective first surfaces 215, 231, 243, 245, 253 and 255. For one application at least 13 beads of adhesive 236 extend longitudinally along first surfaces 215, 231, 243, and 245. These longitudinal beads 236 correspond approximately with the location of vertical layers 118 of fiber reinforced plastic in floor 100. For this same application four beads of adhesive 236 preferably extend laterally across first surfaces 253 and 255 of body bolsters 222 and 224.

For some applications, it may be desirable to form an adhesive bond at each location where exterior surface 102 of composite box structure 30 contacts railway car underframe 200. For other applications, it may be desirable to form an adhesive bond at only selected locations on the first surfaces of railway car underframe 200 such as first surfaces 243 and 245 of side sills 242 and 244 and first surfaces 282 and 285 of end sills 282 and 284. Adhesive bonding is preferably conducted in a paint shop environment to allow control of the temperature and humidity to ensure a satisfactory adhesive bond between composite box structure 30 and railway car underframe 200.

During the molding process, one or more strips of peel ply may be placed on exterior surface 102 of floor 100. U.S. Pat. No. 5,052,906 shows examples of such molding processes which include the use of peel ply layers. For some applications, peel ply strips may not be required.

For the embodiment of the present invention as shown in FIG. 11, peel ply strip or protective strip 238 is formed on exterior surface 102 in a location corresponding with first surface 215 of center sill 214. Peel ply strips 223 and 225 extend laterally across exterior surface 102 at a location corresponding approximately with first surfaces 253 and 255 of body bolsters 222 and 224. Thus peel ply strips 223, 225 and 238 cooperate with each other to protect the portions of exterior surface 102 which will be adhesively bonded with railway car underframe 200. If desired, additional peel ply strips (not shown) may be placed on exterior surface 102 to correspond with first surface 231 of each longitudinal stringer 230.

Prior to mounting composite box structure 30 on railway car underframe 200, exterior surface 102 of floor 100 is preferably prepared to enhance the resulting adhesive bond with railway car underframe 200. Peel ply strips 223, 225 and 238 are removed. Portions of exterior surface 102 may be roughed with sandpaper or other material to enhance the adhesive bonding with adjacent portions of railway car underframe 200. Also, portions of fiber reinforced plastic 102 covering each metal plate 262 is cut away and the protective clay filler removed from threaded openings 264.

Figure 7:
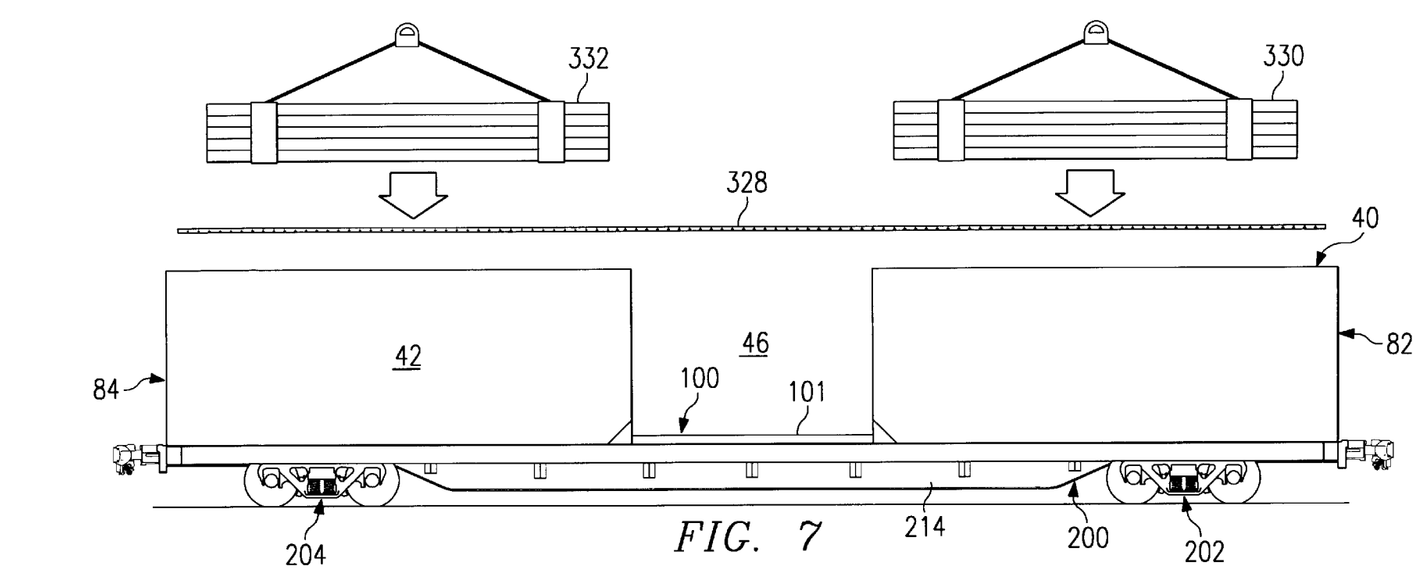
FIG. 7 is a schematic drawing in elevation showing one of the steps associated with attaching the composite box structure of FIG. 5 with the railway car underframe of FIG. 3.

After composite box structure 30 has been placed on railway car underframe 200, lifting straps 324, vertical straps 314 and horizontal strap 316 may be removed along with second composite unit 120. Supporting frames 318 are also removed at this time. As shown in FIG. 7, protective lower pad 328 may be placed on interior surface 101 of floor 100. Protective pad 328 prevents damage to interior surface 101 during the assembly of railway boxcar 20.

For some applications, weights 330 and 332 may be placed on protective pad 328 to assist in obtaining the desired adhesive bond between exterior surface 102 of floor 100 and railway car underframe 200 if floor 100 has a slight bend or curve or if first composite unit 40 does not have sufficient weight by itself to obtain the desired adhesive bond with railway car underframe 200. As previously noted, mechanical tie down connection assemblies 260 and metal plates 262 assist in forming the desired adhesive bonds. For on application, the use of weights 330 and 332 was not required.

As best shown in FIG. 8, upper load divider track assembly 140 includes a pair of tracks 142 and 144 which are releasably coupled with temporary supporting jig 334 to maintain the desired alignment of first track 142 with respect to second track 144. A plurality of brackets 146 are attached to side walls 42 and 44 opposite from floor 100. Brackets 146 cooperate with each other to allow mounting upper load divider track assembly 140 on the side walls 42 and 44 opposite from floor 100. Bracket 146 secures tracks 142 and 144 on interior surface 51 of the respective side walls 42 and 44 adjacent to interior surface 121 of roof 120.

Roof 120 has a generally rectangular configuration with a length corresponding approximately to the length of side walls 42 and 44 and the length of floor 100. The width of roof 120 corresponds approximately to the width of end walls 82 and 84 and the width of floor 100. Interior surface 121 of roof 120 preferably has a generally concave configuration and exterior surface 123 has a generally corresponding convex configuration. For some applications, flanges 124 are formed along longitudinal edges 125 and extend from interior surface 121. Each flange 124 is sized to engage a portion of the interior surface of the respective side walls 42 and 44 when roof 120 has been attached to end walls 82 and 84 and side walls 42 and 44. Metal supporting plates (not expressly shown) may be integrally molded within side walls 42 and 44 for attachment with respective flanges 124 by appropriate mechanical fasteners (not expressly shown).

Figure 9:
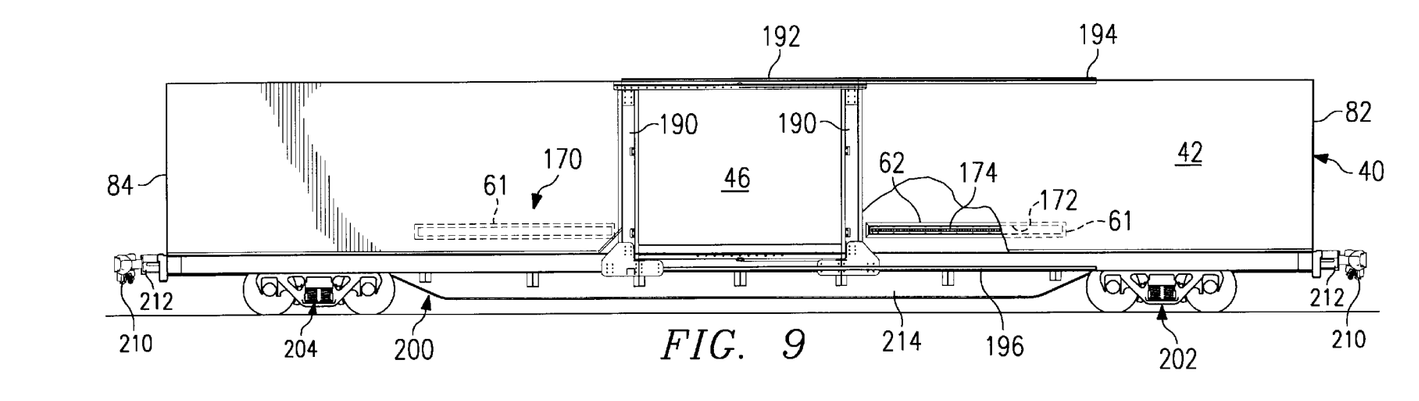
FIG. 9 is a schematic drawing in section and in elevation with portions broken away showing portions of a lower load divider track assembly, a door frame assembly, and upper and lower tracks for a sliding door installed or attached to the composite box structure of FIG. 5.
Figure 10:
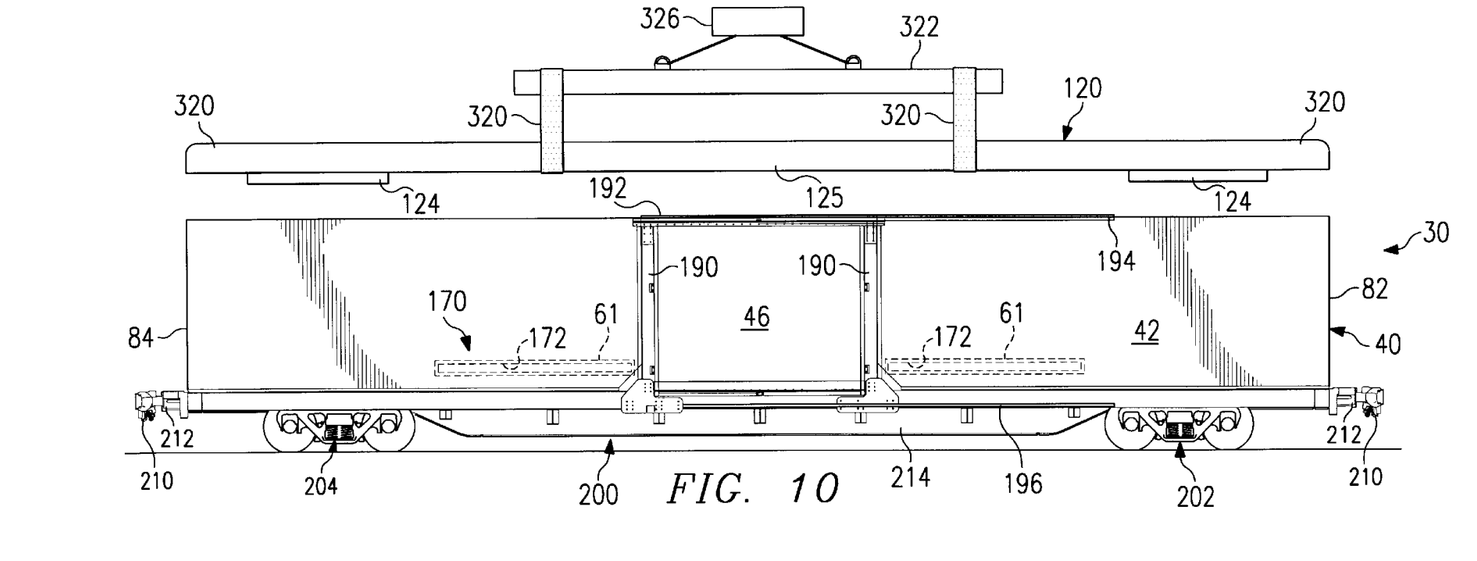
FIG. 10 is a schematic drawing in elevation showing one of the steps associated with permanently attaching a roof to form the composite box structure for the railway boxcar shown in FIG. 1A.

Portions of lower load divider track assembly 170 are also shown in FIGS. 9–10 including a pair of tracks 172 and 174 disposed respectively within first longitudinal recess 61 and second longitudinal recess 62. First longitudinal recess 61 is formed in interior surface 51 of side wall 42 located above interior surface 101 of floor 100. Second longitudinal recess 62 is formed within interior surface 51 of side wall 42 located above interior surface 101 of floor 100. Portions of first longitudinal recess 61 and track 172 are disposed on opposite sides of opening 46 in side wall 42. Portions of second longitudinal recess 62 and track 174 are disposed on opposite sides of opening 46 in side wall 44.

Upper load divider track assembly 140 and lower load divider track assembly 170 are preferably aligned with each other. Tracks 172 and 174 extend generally parallel with tracks 142 and 144 and floor 100. As shown in FIG. 9, vertical door frames 190 are attached along each side of opening 46 in side walls 42 and 44. Door header 192 and upper door track 194 are also installed on opening 46 extending along the respective side walls 42 and 44. After the assembly of other components associates with composite box structure 30, second fiber reinforced composite unit or roof 120 may be permanently attached to side walls 42 and 44 and end walls 82 and 84 with portions of upper load divider track assembly track 140 disposed there between.

An appropriate adhesive is placed on the top of end walls 82 and 84 and side walls 42 and 44 opposite from floor 100. A plurality of washers or shims (not shown) similar to spacers 234 are also placed on the top of end walls 82 and 84 and side walls 42 and 44 opposite from floor 100 to maintain the desired thickness of the resulting adhesive bond between roof 102 and first fiber reinforced composite unit 40.

Roof 120 is mounted on side walls 42 and 44 and end walls 82 and 84 using crane 326 and spreader 322 along with straps 320. For some applications, suction cups (not shown) may be used to lift roof 120 instead of straps 320. After roof 120 has been properly positioned on side walls 42 and 44 and end walls 82 and 84, strap 32 may be removed. Additional straps (not expressly shown) may be wrapped around composite box structure 30 and railway car underframe 200 to maintain close contact between roof 120 and first composite unit 40 until the desired adhesive bond has been achieved. The number and location of these straps may be varied to obtain the desired bond thickness and water tight seal between roof 120 and first composite unit 40. One or more straps may be placed through opening 46 to firm secure door headers 192 with adjacent portions of roof 120. Temporary supporting jig 334 may then be removed from first track 142 and second track 144.

Various safety appliances such as ladders 206 and hand brake 208, along with end platform mechanisms may be attached to railway car underframe 200 using appropriate mechanical fasteners (not explicitly shown). This aspect of the present invention eliminates any connections or attachments between the safety appliances and composite box structure 30, and avoids welding after mounting composite box structure 30 on railway car underframe 200. For some applications, ladders 206 and/or hand brake 208 could be attached to railway car underframe 200 by welding prior to mounting composite box structure 30 thereon.

The following specifications are for railway boxcar 20 incorporating one embodiment of the present invention.

| | |
|---|---|
| Outside length | 68 feet 0 inches |
| Inside length | 67 feet 2 inches |
| Distance between center line of railway trucks | 50 feet 0 inches |
| Outside width of composite box structure | 10 feet 0 inches |
| Inside width | 9 feet 2 inches |
| Height from rail to top of car | 15 feet 6 inches |
| Inside height from floor to roof | 11 feet ½ inch |
| Height of door opening | 9 feet 6½ inches |
| Width of door opening | 12 feet 0 inches |
| Internal volume with load dividers | 6,170 cubic feet |
| Internal volume without load dividers | 6,291 cubic feet |
| Light weight | 86,000 pounds |

-continued

| Nominal load carrying capacity | 200,000 pounds |
|---|---|
| Total gross rail load | 286,000 pounds |

Although the present invention and its advantages have been described in detail, it should be understood that various changes, substitutions and alterations can be made herein without departing from the spirit and scope of the invention as defined by the following claims.

What is claimed is:

1. A method of assembling a first molded fiber reinforced composite unit having a pair of opposite side walls and a pair of opposite end walls extending between the side walls, a floor extending between the side walls and the end walls, and an opening formed in each side wall intermediate the ends thereof with a second molded fiber reinforced composite unit to form an insulated composite railway boxcar comprising the steps of:

mounting the first molded fiber reinforced composite unit on a railway car underframe; and permanently attaching the second molded fiber reinforced composite unit with the side walls and the end walls opposite from the floor to provide a roof for the railway boxcar.

2. The method of claim 1 including the step of attaching safety equipment to the railway car underframe with no connections between the safety equipment and the first molded fiber reinforced composite unit.

3. The method of claim 1 further comprising the steps of:

placing the second molded fiber reinforced composite unit on the side walls and the end walls opposite from the floor; and placing a plurality of straps over the second molded fiber reinforced composite unit and the first molded fiber reinforced composite unit to allow shipment of the first molded fiber reinforced composite unit and the second fiber reinforced composite unit prior to mounting the first molded fiber reinforced composite unit on the railway car underframe.

4. The method of assembly of claim 1 further comprising the step of placing a protective pad on the floor prior to permanently attaching the second molded fiber reinforced composite unit with the first molded fiber reinforced composite unit.

5. The method of claim 1 further comprising the steps of:

forming a plurality of coplanar surfaces on the railway car underframe;

placing a plurality of spacers on selected coplanar surfaces with each spacer having a first thickness;

covering the selected coplanar surfaces with an adhesive having a thickness at least equal to the spacers; and adhesively bonding the first molded fiber reinforced composite unit with the railway car underframe.

6. The method of claim 5 further comprising the steps of:

attaching a plurality of tie down connections to the railway car underframe with each tie down connection having at least one threaded bolt extending upwardly therefrom;

forming a plurality of threaded openings in the floor of the first molded fiber reinforced composite unit with the threaded openings extending through the exterior thereof; and engaging each of the threaded bolts extending from one of the tie down connections with one of the threaded openings formed in the floor.

7. The method of claim 1 further comprising the steps of:

attaching a plurality of tie down connections to the railway car underframe with each tie down connection having at least one threaded bolt extending upwardly therefrom;

forming a plurality of threaded openings in the floor of the first molded fiber reinforced composite unit with the threaded openings extending through the exterior thereof; and engaging each of the threaded bolts extending from one of the tie down connections with one of the threaded openings formed in the floor.

8. The method of claim 1 further comprising the steps of:

releasably coupling an upper load divider track assembly having a pair of tracks with a temporary supporting jig to maintain alignment of the first track with respect to the second track;

mounting the upper load divider track assembly on the side walls opposite from the floor;

permanently attaching the second molded fiber reinforced composite unit with the side walls and the end walls with portions of the upper load divider track assembly disposed therebetween; and removing the temporary supporting jig from the first track and the second track.

9. The method of claim 1 further comprising the steps of:

releasably coupling an upper load divider track assembly having a pair of tracks with a temporary supporting jig to maintain alignment of the first track with respect to the second track;

mounting the upper load divider track assembly on the side walls opposite from the floor;

forming a first longitudinal recess within the interior of one side wall and forming a second longitudinal recess in the interior of the other side wall;

installing a lower load divider track assembly having a pair of tracks with one track mounted within the first longitudinal recess and the other track mounted in the second longitudinal recess;

aligning the upper load divider track assembly with the lower load divider track assembly;

permanently attaching the second molded fiber reinforced composite unit with the side walls and the end walls with portions of the upper load divider track assembly disposed therebetween; and removing the temporary supporting jig from the first track and the second track.

10. The method of claim 1 further comprising the step of placing a wooden frame within each opening to provide structural stability for the first molded fiber reinforced composite unit prior to mounting the first molded fiber reinforced composite unit on the railway car underframe.

11. The method of claim 1 further comprising the step of temporarily placing at least one strip of protective material on portions of the exterior surface of the floor to protect corresponding portions of the fiber reinforced plastic exterior prior to mounting the composite box structure on the railway car underframe.

12. A method of assembling an insulated composite railway boxcar comprising the steps of:

forming an integrally molded composite box structure having a pair of opposite side walls, a pair of opposite end walls extending between the side walls, a floor extending between the side walls and the end walls, an opening formed in each side wall intermediate the end thereof, and a roof extending between the side walls and the end walls opposite from the floor;

placing the composite box structure on a railway car underframe; and permanently attaching the composite box structure to the railway car underframe.

13. The method of claim 12 wherein the step of permanently attaching the composite box structure to the railway car underframe further comprises the step of forming a plurality of mechanical connections between the railway car underframe and portions of the composite box structure.

14. The method of claim 12 wherein the step of permanently attaching the composite box structure to the railway car underframe further comprises the step of adhesively bonding portions of the composite box structure with portions of the railway car underframe.

15. A method of assembling an insulated composite railway boxcar comprising the steps of:

forming a first fiber reinforced composite unit having a pair of opposite side walls, a pair of opposite end walls extending between the side walls, a floor extending between the side walls and the end walls, and an opening formed in each side wall intermediate the ends thereof;

forming a second fiber reinforced composite unit having a generally rectangular configuration with a length corresponding to the side walls and a width corresponding to the end walls;

mounting the first molded fiber reinforced composite unit on a railway car underframe; and permanently attaching the second molded fiber reinforced composite unit with the side walls and the end walls opposite from the floor to provide a roof for the composite railway boxcar.

16. The method of claim 15 further comprising the steps of:

forming a plurality of coplanar surfaces on the railway car underframe for use in adhesively bonding portions of the first fiber reinforced composite unit with the railway car underframe;

placing at least two beads of adhesive extending longitudinally along the coplanar surfaces with the longitudinal beads of adhesive spaced laterally from each other; and placing at least two beads of adhesive extending laterally across selected coplanar surfaces with the two lateral beads of adhesive spaced longitudinally from each other.

* * * * *